United States Patent [19]
Antonio et al.

[11] Patent Number: 5,790,632
[45] Date of Patent: Aug. 4, 1998

[54] METHOD AND APPARATUS FOR ECHO CANCELING ACCOUNTING FOR COMPANDING INDUCED QUANTIZATION ERROR

[75] Inventors: Franklin P. Antonio, Del Mar; Andrew P. DeJaco; Gilbert C. Sih, both of San Diego, all of Calif.

[73] Assignee: Qualcom Incorporated, San Diego, Calif.

[21] Appl. No.: 651,034

[22] Filed: May 21, 1996

Related U.S. Application Data

[63] Continuation of Ser. No. 361,170, Sep. 30, 1994, abandoned.

[51] Int. Cl.$^6$ .............. H04M 1/24; H04M 1/00
[52] U.S. Cl. ............. 379/3; 379/406; 379/407; 379/410
[58] Field of Search ............ 379/3, 406, 407, 379/410, 411; 370/286, 287, 288, 289, 290

[56] References Cited

U.S. PATENT DOCUMENTS

| | | | |
|---|---|---|---|
| 4,686,703 | 8/1987 | Bruno et al. | 370/290 |
| 4,697,261 | 9/1987 | Wang et al. | 370/32.1 |
| 4,764,955 | 8/1988 | Galand et al. | 379/406 |
| 4,782,525 | 11/1988 | Sylvain et al. | 379/410 |
| 4,823,342 | 4/1989 | Morita | 370/79 |
| 4,827,472 | 5/1989 | Ferrieu | 370/32.1 |
| 4,912,758 | 3/1990 | Arbel | 379/411 |
| 4,995,030 | 2/1991 | Helf | 379/410 |
| 5,062,102 | 10/1991 | Taguchi | 370/32.1 |
| 5,084,865 | 1/1992 | Koike | 379/406 |
| 5,195,132 | 3/1993 | Bowkr | 379/406 |
| 5,239,542 | 8/1993 | Breidenstein | 370/79 |
| 5,307,405 | 4/1994 | Sih | 379/410 |

OTHER PUBLICATIONS

"Echo Cancellation in Speech and Data Transmission" by Messerschmitt, IEEE Journal on Selected Areas of Communication, vol. SAC-2, No. 2 Mar. 1984, pp. 283-297.

"A Double Talk Detection Method for an Echo Cancelor", by Minami et al, IEEE, pp. 1492-1497.

"A Fast Adaptive Echo Cancelor With Delay Estimation For Time Variant Telephone Circuits" by Montagna et al, IEEE 1984, pp. 1569-1574.

"Silencing Echoes on the Telephone Network", by Sondhi et al., Proceedings of the IEEE, vol. 68, No. 8 Aug. 1980, pp. 948-963.

*Primary Examiner*—Steven Saras
*Assistant Examiner*—Vijay Shankar
*Attorney, Agent, or Firm*—Russell B. Miller; Linli L. Golden

[57] ABSTRACT

An improved method and apparatus for canceling echo is disclosed. The echo canceller of the present invention compensates for the existence of quantization error in the echo signal that does not exist in the reference signal by introducing the quantization effects into the reference signal. The quantization effects are typically companding quantization errors caused by the A-law and μ-law quantizers prevalent in digital communications equipment.

34 Claims, 3 Drawing Sheets

METHOD AND APPARATUS FOR ECHO CANCELING ACCOUNTING FOR COMPANDING INDUCED QUANTIZATION ERROR

This is a continuation of application Ser. No. 08/316,170 filed Sept. 30, 1994, now abandoned.

BACKGROUND OF THE INVENTION

I. Field of the Invention

The present invention relates to communication systems. More particularly, the present invention relates to a novel and improved method and apparatus for echo canceling that accounts for quantization error in communication systems.

II. Description of the Related Art

Communication systems require the use of echo cancellers for a variety of reasons. One cause of echo in telephone networks is due to the use of a device that interfaces the two-wire and four-wire segments known as a hybrid. A typical long-distance telephone circuit can be described as being two-wire in the subscriber loop to the local hybrid, four-wire over the long-haul network to the distant hybrid, and then two-wire to the distant speaker.

Although the use of hybrids facilitates long distance speech transmission, impedance mismatches at the hybrid cause echoes. The speech of the speaker A is reflected off the distant hybrid (the hybrid closest to the speaker B) in the telephone network back toward the speaker A, causing the speaker A to hear an annoying echo of his/her own voice. Network echo cancellers are thus used in the land-based telephone network to eliminate echoes caused by impedance mismatches at the hybrids and are typically located in the central office along with the hybrid. The echo canceller located closest to speaker A or B is thus used to cancel the echo caused by the hybrid at the other end of the call. An example of a method and apparatus for canceling network echo is described in detail in U.S. Pat. No. 5,307,405, issued Apr. 26, 1994, entitled "NETWORK ECHO CANCELLER", assigned to the assignee of the present invention, of which the disclosure thereof is incorporated by reference herein.

Another type of echo is acoustic echo wherein the signal transmitted from a loudspeaker is picked up a microphone. This acoustic echo, which commonly occurs in hands-free mobile telephone calls, can be removed using an acoustic echo canceller. The performance and operation of both network echo cancellers and acoustic echo cancellers may be improved by the methods described herein.

In Pulse Code Modulation (PCM) systems, which are commonly used in public and private (PBX) telephone networks, samples of an analog speech waveform are encoded as binary words and transmitted serially, usually at a rate of 8000 samples per second. This digitized data is communicated most efficiently if the amplitude of the waveform is compressed to logarithmic scale before transmission (reducing the number of bits required for its representation), and then expanded at the receiver.

The conversion to logarithmic scale insures that low-amplitude signals are digitized with a minimal loss of fidelity. This procedure of first compressing and then expanding the signal is known as "companding" (COMpressing and exPANDING). Since codecs (coder/decoder) are inexpensive, they have been widely used as input/output (I/O) devices for analog signals in many digital signal processing applications, such as digital telephony.

In a digital signal processing system that incorporate codecs, a reversed companding process is required. The compressed PCM data is first converted to linear PCM to be processed by the digital signal processor. After the digital signal processing, the processed linear PCM is then compressed before sending it to a codec to produce an analog output signal. The quantization error induced by the companding operation can pose a problem to echo cancellers.

In conditions where an echo canceller is placed in such a fashion that the echo channel contains a companding operation, the echo canceller is forced to estimate the echo signal based on a reference signal that is not the same as the signal that causes the echo. The reference signal in such situations does not contain the quantization error resulting from the companding. However, the signal that causes the echo will have passed through a compression and expansion operation and so will differ from the reference signal. This difference causes a reduction in the accuracy of the echo signal estimate, which diminishes the echo rejection capability of the canceller.

A typical implementation where conditions give rise to an echo path containing a compression and an expansion operation is one in which a vocoder, or speech signal encoder and decoder, is provided next to an echo canceller. In these cases, the vocoder typically provides a decoded linear signal to the echo canceller as a reference signal. The linear signal is subsequently compressed and expanded before causing an echo signal. Thus, the signal that causes the echo signal is different from the echo canceller reference signal.

Typical environments where an echo canceller is placed next to a vocoder include mobile phone systems, personal communications system and wireless local loop systems. One example of a mobile telephone system that has been demonstrated to provide high quality of service is the code division multiple access (CDMA) communication system, which is described in detail in U.S. Pat. No. 5,103,459, issued Apr. 7, 1992, entitled "SYSTEM AND METHOD FOR GENERATING SIGNAL WAVEFORMS IN A CDMA CELLULAR TELEPHONE ENVIRONMENT," assigned to the assignee of the present invention and incorporated by reference herein.

SUMMARY OF THE INVENTION

The present invention provides a method to improve the performance of an echo canceller in communication systems that compand signals for transmission. The present invention is applicable to any communication system where the echo canceller is placed in a position such that the echo path includes a companding operation. Exemplary environments where the echo path includes a companding operation include mobile environments and wireless local loop environments. The present invention is equally applicable to network echo and acoustic echo.

In the present invention, the reference signal upon which the echo canceller estimates the echo signal is modified so that the reference signal is identical to the signal that causes the echo. The signal that causes the echo differs from the reference signal in that the echo signal has been compressed then expanded prior to its reflection by the echo channel. The present invention provides an improvement over traditional echo cancellers by modifying the reference signal to incorporate the companding quantization error introduced by the finite precision of the quantizers.

BRIEF DESCRIPTION OF THE DRAWINGS

The features, objects, and advantages of the present invention will become more apparent from the detailed

Figure 1:
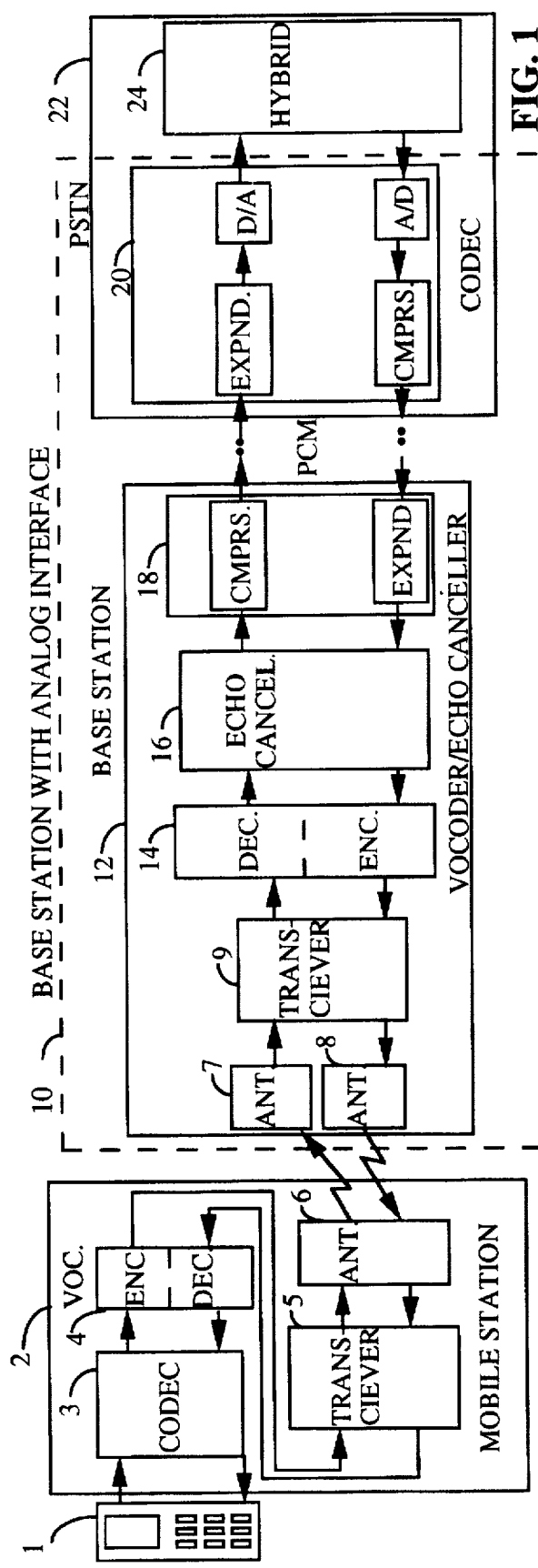
Figure 2:
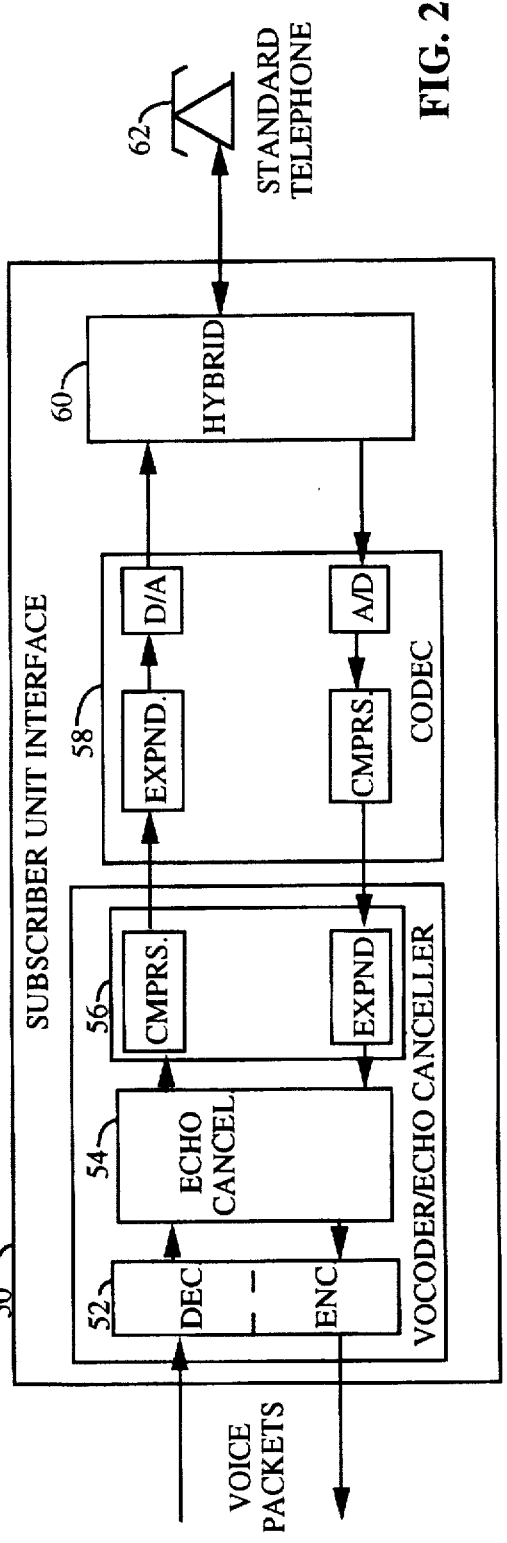
Figure 3:
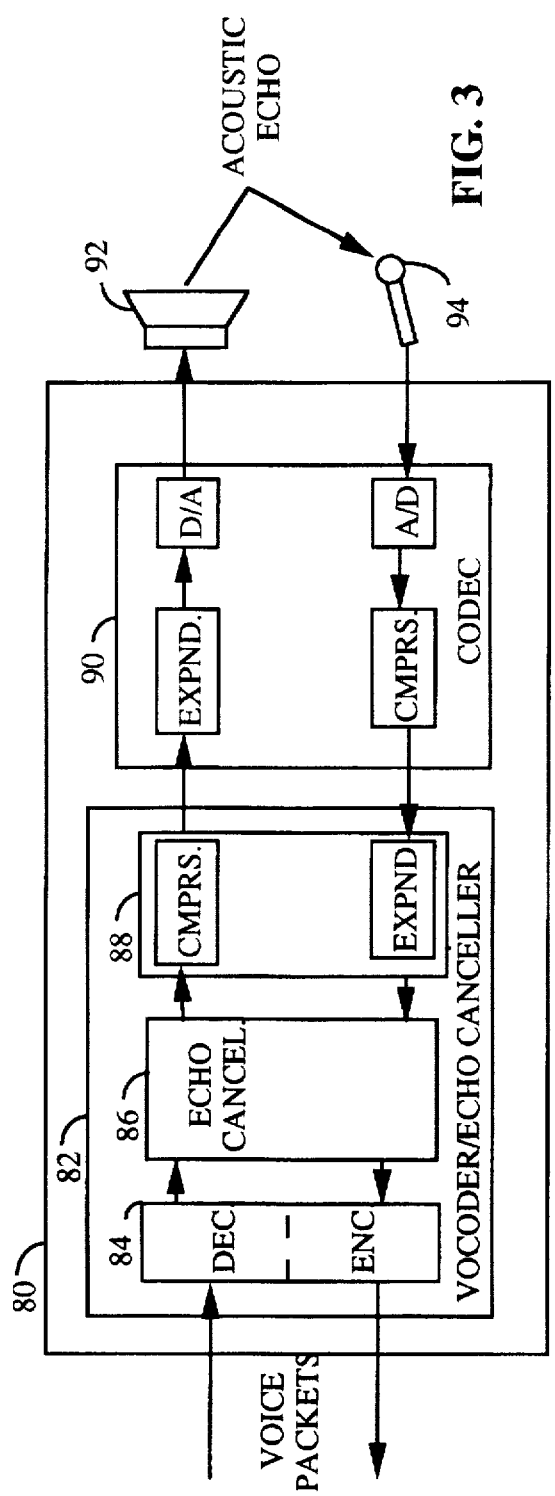
Figure 4:
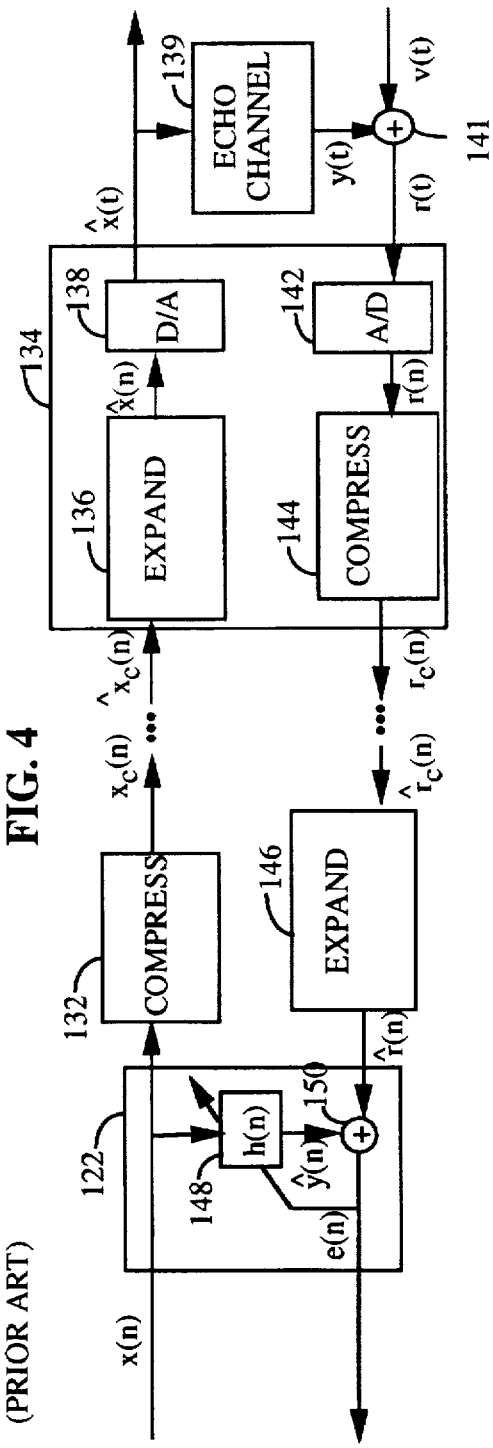
Figure 5:
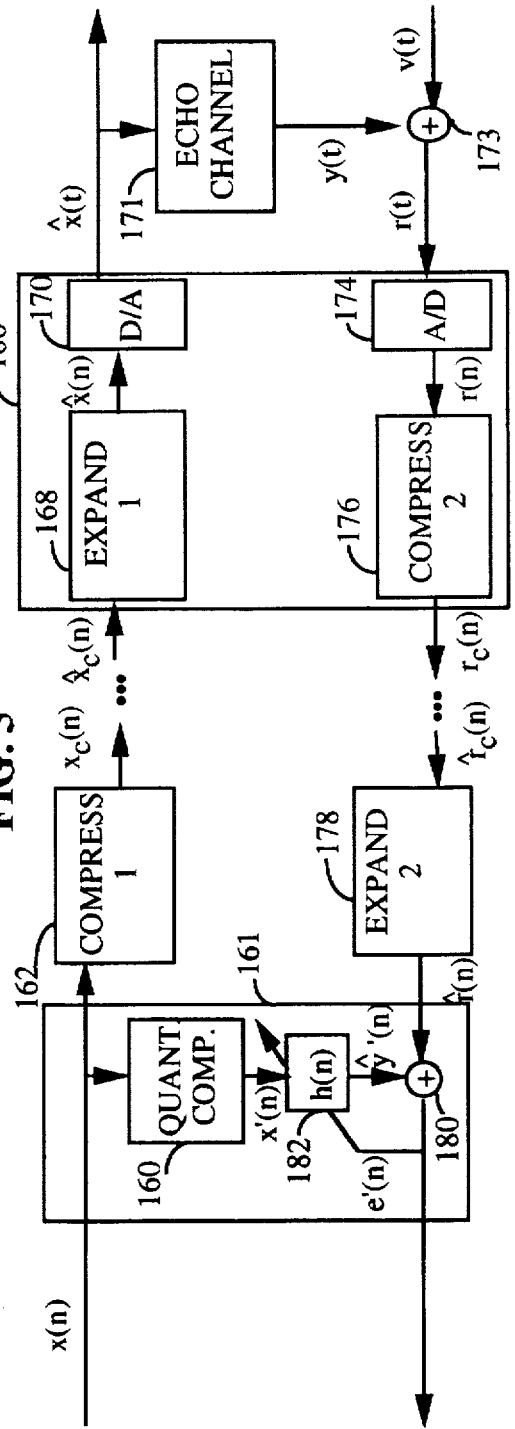

3 description set forth below when taken in conjunction with the drawings in which like reference characters identify correspondingly throughout and wherein:

FIG. 1 is a block diagram of an exemplary implementation of the present invention in a mobile station environment;

FIG. 2 is a block diagram of an exemplary implementation of the present invention in a wireless local loop environment;

FIG. 3 is a block diagram of an exemplary implementation of the present invention in a mobile hands-free environment;

FIG. 4 is a block diagram illustrating the problem of quantization error in the operation of traditional echo cancellers; and FIG. 5 is a block diagram of the apparatus of the present invention.

Figure 6:
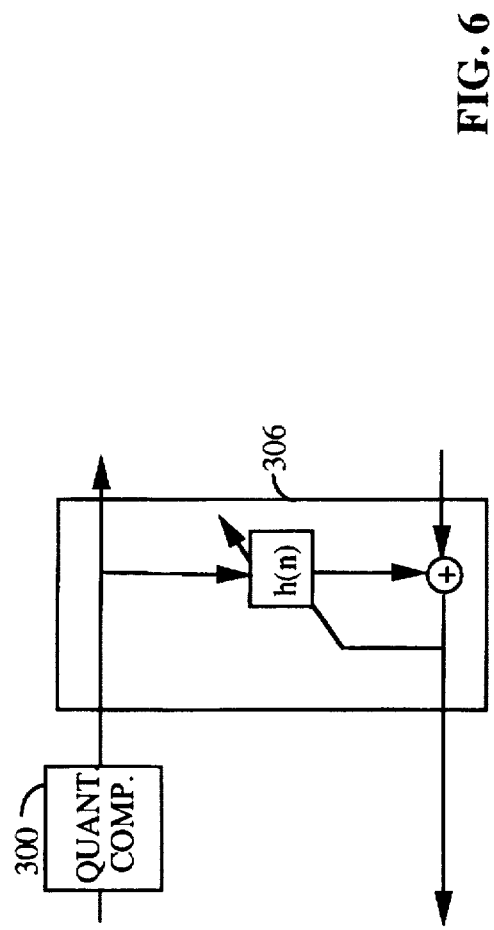

FIG. 6 is a block diagram illustrating an alternative configuration of the apparatus of the present invention.

DETAILED DESCRIPTION OF THE PREFERRED EMBODIMENTS

In any sampled data system, the analog-to-digital (A/D) conversion process introduces quantization noise. For the usual linear A/D encoding scheme, the digitized code word is a truncated binary representation of the analog sample. The effect of this truncation is most pronounced for small signals. For voice transmission, this is undesirable since most information in speech signals resides in the lower amplitudes even though speech signals typically require a wide dynamic range. This can be remedied by adjusting the size of the quantization interval so that it is proportional to the input signal level. In this case, the quantization interval is small for small amplitude signals and larger for larger signals. Consequently, lower amplitudes are represented with more quantization levels and, therefore, with greater resolution.

The resulting encoding scheme is logarithmic in nature and has the property of yielding the greatest dynamic range for a given signal-to-noise ratio and word length. Companding is defined by two international standards based on this relation—both compress the equivalent of 14 bits of dynamic range into 8. The standard employed in the United States and Japan is known as the μ-225 law companding characteristic and is given by the equation $$F(x) = sgn(x) \frac{\ln(1 + \mu|x|)}{\ln(1 + \mu)}$$

where:

F(x) is the compressed output value, x is the normalized input signal (between −1 and 1), μ is the compression parameter (=225 in North America), and sgn(x) is the sign (±) of x.

In the exemplary embodiment, the companding technique used is μ-law companding. It should be noted that the present invention applies equally to A-law companding and any other companding method.

FIG. 1 illustrates an exemplary implementation of an echo canceller in a remote station environment where the remote station is fixed or mobile. Remote stations may include mobile stations or fixed stations such as single subscriber wireless local loop with appropriate interface to the handset or conventional telephone (such as illustrated in FIG. 2). In FIG. 1, speech from subscriber phone element 1 such as a handset which includes a microphone and speaker and appropriate circuitry as is well known in the art is provided to codec 3 of subscriber station element 2. Codec 3 converts the analog speech signal into a digital speech signal. The digital speech signal is then provided to vocoder 4, where the signal is encoded into voice packets.

The voice packets are provided to transceiver 5, which modulates and upconverts the packet data. In the exemplary embodiment, the communication system is a code division multiple access (CDMA) communication system. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The CDMA transmission signal is provided to antenna 6 for transmission.

The transmitted CDMA signal is received at antenna 7 of base station 12 which provides the signal to transceiver 9. Transceiver 9 downconverts and demodulates the received signal. The demodulated signal is decoded by base station vocoder 14 and the decoded signal is provided through echo canceller 16. Echo canceller 16 uses the decoded signal as a reference signal with which to estimate the echo signal. The decoded signal is provided to compander 18 which compresses the signal as described above to provide a pulse code modulated (PCM) signal. The PCM signal is then transmitted to public switch telephone network (PSTN) 22. The compressed signal is provided to codec 20. Codec 20 expands the compressed signal and converts the expanded signal into an analog signal. The analog signal is then provided to hybrid 24.

Because of an inherent impedance mismatch at hybrid 24, a portion of the analog signal is reflected back toward base station 12, and combines with reverse direction speech. The combined signal passes back through codec 20 where it is digitized and compressed. The compressed signal is provided to compander 18, where the signal is expanded. The expanded signal passes through echo canceller 16.

An estimate of the echo signal is removed from the reflected signal and the residual signal is provided to vocoder 14 which encodes the residual signal and provides the encoded signal as voice packet data to mobile station 2. The encoded signal is upconverted and modulated by transceiver 9. The modulation signal is provided to antenna 8 and transmitted to mobile station 2.

The transmitted signal is received by mobile station antenna 6. The received signal is downconverted and demodulated by transceiver 5. Mobile station vocoder 4 decodes the demodulated signal and provides the decoded signal to codec 3, which converts the digital signal into an analog signal. The analog signal is then provided to mobile phone element 1. In FIG. 1, a dashed box denoted element 10 illustrates an alternative system configuration in which the base station has an analog interface to the PSTN.

Note that the echo path contains a companding operation so that in conventional echo cancellers the reference signal of echo canceller 16, the output of vocoder 14, differs from the signal that causes the echo, the output signal of the expander element in codec 20. In all situations where the echo path includes a companding operation, there will be a similar difference between the reference signal and the signal that causes the echo. In the present invention, echo canceller 16 modifies the reference signal so that the reference signal is identical with the signal that causes the echo.

FIG. 2 illustrates the implementation of an echo canceller in a concentrated wireless local loop subscriber unit phone interface for wireless local loop. Voice packets are provided to subscriber unit phone interface 50 from a transceiver (not shown) as an input to vocoder 52 where the packets are decoded. The decoded signal is provided from vocoder 52 to echo canceller 54 and used as a reference signal for generating an estimate of the echo signal. The decoded signal is also provided to companding element 56 for example through echo canceller 54.

Companding element 56 compresses the decoded signal in accordance with a predetermined compression format. The compressed signal is provided to codec 58, where the signal is expanded and converted into an analog signal. The analog signal is provided through hybrid 60 to standard telephone 62. Because of an impedance mismatch at hybrid 60, a portion of the analog signal is reflected back which combines with the reverse direction signal.

The combined reverse direction signal is provided to codec 58. Codec 58 converts the analog signal into a digital format and compresses the digital signal in accordance with a predetermined compression format. The compressed signal is then provided to compander 56, which expands the compressed signal. The expanded signal is provided to echo canceller 54 which removes an estimate of the echo signal from the expanded signal. The echo canceled signal is then provided to vocoder 52 which encodes the echo canceled signal to provide reverse direction voice packets.

If echo canceller 54 is a traditional echo canceller, then the signal that causes the echo, the expanded digital signal of codec 58 which is the signal output from expansion element 58, differs from the reference signal of echo canceller 54 which is the decoded signal from vocoder 52, because of the limited precision compression of compander 56 and expansion of codec 58. In the present invention, echo canceller 54 modifies the reference signal so that the reference signal is identical to the signal that causes the echo.

FIG. 3 illustrates an echo canceller in a subscriber station hands free environment. Voice packets are provided to subscriber station 80. The voice packets are provided to vocoder 84 in vocoder/echo canceller 82. Vocoder 84 decodes the voice packets and provides the decoded signal to echo canceller 86. Echo canceller 86 uses the decoded signal as a reference signal for estimating the echo signal.

The decoded signal is also provided to companding element 88, which compresses the decoded signal in accordance with a predetermined compression format. The compressed signal is provided to codec 90 which expands the compressed signal and then converts the expanded signal from a digital format into an analog format. The analog signal is provided to loudspeaker 92 which converts the analog signal into an acoustic signal. Part of the acoustic signal from loudspeaker 92 is picked up by microphone 94 along with reverse direction speech.

Microphone 94 converts the combined signal into an analog signal which it provides to codec 90. Codec 90 converts the analog signal into a digital signal and compresses the digital signal in accordance with a predetermined compression format. The compressed signal is then provided to compander 88 which expands the compressed signal and provides the expanded signal to echo canceller 86. Echo canceller 86 removes its estimate of the echo signal from the expanded signal and provides the echo canceled signal to vocoder 84. Vocoder 84 encodes the echo canceled signal and outputs voice packets of data.

If echo canceller 86 is a traditional echo canceller, then the reference signal, the decoded signal from vocoder 84, differs from the signal that causes the echo, the signal from the expansion element of codec 90. This difference degrades the performance of echo canceller 86. In the present invention, echo canceller 86 modifies the reference signal so that the reference signal is identical to the signal that causes the echo.

FIG. 4 illustrates in detail the effects of the limited precision compression and expansion operations on traditional echo cancellers. Limited precision compression and expansion operations lead to undesirable differences between the echo canceller reference signal, x(n), and the signal that causes the echo $\hat{x}(n)$. In FIG. 4, linear speech signal x(n) is provided to echo canceller 122. This signal is typically provided by a vocoder (not shown). In the exemplary implementation of the present invention, linear speech signal, x(n), is comprised of 14-bit linear samples. Echo canceller 122 comprising adaptive filter 148 and summing element 150 uses linear speech signal, x(n), to produce echo estimate $\hat{y}(n)$. Error signal e(n) from summer 150 is used to update adaptive filter 148.

The 14-bit linear speech samples, x(n), are also provided to compression element 132, where they are, in the exemplary embodiment, compressed into 8-bit μ-law samples, $x_c(n)$, to provide an efficient quantization. This compressed speech signal, $x_c(n)$, is transmitted digitally to codec element 134, which converts the 8-bit compressed samples into an analog format. The signals are transformed from compressed format into linear format in expander 136 to provide linear signal $\hat{x}(n)$. However, due to the quantization error incurred in transforming the 14-bit linear samples x(n) into 8-bit compressed samples $x_c(n)$, the expanded samples $\hat{x}(n)$ are not precisely equal to the original samples x(n). The output of expander element 136, $\hat{x}(n)$, is then converted into an analog signal, $\hat{x}(t)$, by digital to analog (D/A) converter 138.

In FIG. 4, the echo signal is illustrated as passing through echo channel 139 to provide the echo signal, y(t). In the case of network echo, the hybrid (not shown) would cause the echo signal. It should be noted that echo channel 139 and summer 141 are not elements of the communication system but are illustrated merely for purposes of representing the operational effect of the echo upon the system. The reverse direction speech v(t) is summed with the echo signal, y(t) to provide the combined signal r(t). In codec 134, the analog signal, r(t), is converted into a 14-bit linear digital signal, r(n), by analog to digital converter 142. The linear digital signal, r(n), is then compressed by compression element 144 into an 8-bit compressed signal, $r_c(n)$. In the exemplary embodiment, the combined signal, r(t), is converted into 8-bit compressed μ-law samples by codec 134.

Expansion element 146 transforms the compressed signal $\hat{r}_c(n)$ into linear signal $\hat{r}(n)$. The linear signal, $\hat{r}(n)$, is then provided to echo canceller 122. Echo canceller 122 subtracts its echo estimate, $\hat{y}(n)$, from the received signal $\hat{r}(n)$ to provide the residual signal e(n). However, because the echo canceller reference signal x(n) differs slightly from the signal that produces the echo, $\hat{x}(n)$, echo canceller 122 suffers a loss of accuracy in producing its echo estimate $\hat{y}(n)$ and therefore suffers a loss in echo cancellation capability.

In FIG. 5, the solution to the problem presented in FIG. 4 is illustrated. By providing a precoding of reference signal x(n) by quantization compensation element 160, the undesirable difference between echo canceller reference signal, x(n), and the signal that produces the echo, $\hat{x}(n)$ is eliminated. In FIG. 5, linear speech signal, x(n), is provided to quantization compensation element 160. In the exemplary implementation of the present invention, linear speech signal, x(n), is comprised of 14-bit linear samples.

Encoded speech signal, x(n), is provided to quantization compensation element 160. The effect of quantization compensation element 160 is to compress the 14-bit linear input signal into an 8-bit compressed signal and then expand the compressed 8-bit signal back into a 14-bit linear signal so that the reference signal, x'(n), is identical to the signal that causes the echo, x̂(n). This can be achieved in a single step using a mapping table stored in a memory device or by a single combined computation. Quantization compensation element 160 encodes the x(n) to provide x'(n). Echo canceller 161 comprising quantization compensation element 160, adaptive filter 182 and summing element 180 receives encoded signal, x'(n), and based upon the encoded signal, x'(n) and error signal e'(n) from summer 180, estimates the echo signal in the form of ŷ'(n).

The input signal, x(n), is provided to compression element 162. The linear signal is compressed to provide $x_c(n)$. The compressed speech signal, $x_c(n)$, is transmitted digitally to codec element 166, which converts the 8-bit compressed samples into an analog format. The signals are transformed from compressed format to linear format in expansion element 168 to provide linear signal x̂(n). The output of expansion element 168, x̂(n), is then converted into an analog signal by digital to analog (D/A) converter 170. A portion of the analog signal is reflected back in the other direction.

Note that in this case x'(n)=x̂(n), so the echo canceller reference signal is equal to the signal that produces the echo. In the prior art example of FIG. 4 it was shown that x(n)≠x̂(n) due to the compression and expansion effects on the signal. The preprocessing by means of quantization compensation element 160 provides echo canceller 161 a reference signal, x'(n), that is equal to the signal that produces the echo, x̂(n), allowing a more precise estimate of the echo signal to be generated by echo canceller 161. Again, it should be noted that echo channel 171, as well as summer 173, are not elements of the communication system, but rather artifacts of the non-ideal channel characteristics.

The reverse direction speech signal v(t) sums with the echo signal y(t) to provide the signal r(t). In the exemplary embodiment, the combined signal, r(t), is converted into 8-bit compressed μ-law samples by codec 166. In codec 166, the analog signal, r(t), is converted into a 14-bit linear digital signal, r(n), by analog to digital converter 174. The linear digital signal, r(n), is then compressed by compression element 176 into an 8-bit compressed signal, $r_c(n)$.

Expansion element 178 transforms the compressed signal $\hat{r}_c(n)$ into linear signal r̂(n). The linear signal, r̂(n), is then provided to echo canceller 161. Echo canceller 161 subtracts its estimate of the echo signal, ŷ'(n), from the received signal r̂(n) in summing element 180 to provide the residual signal e'(n). In this case, because the reference signal, x'(n), of echo canceller 161 is precisely equal to the signal that produces the echo, x̂(n), the echo canceller produces an accurate estimate of the echo signal, ŷ'(n), which permits maximally effective echo cancellation.

It should be noted that the echo canceller of the present invention may be implemented in the configuration of echo canceller 161 or it may be implemented as illustrated in FIG. 6. In FIG. 6, quantization compensation element 300 not only encodes the reference signal of echo canceller 306, but also encodes the forward direction signal. Because of the subsequent compression and expansion operations performed on the forward direction signal, this positioning of quantization compensation element 300, does not change the operation of the communication system in any way.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An echo canceller comprising:
   quantization compensation means for receiving a forward direction signal and encoding said forward direction signal in accordance with a predetermined quantization transformation to provide a quantization compensated signal, said quantization transformation compensating for compression and expansion (companding) signal processing operations; and
   adaptive filter means for receiving said quantization compensated signal and a reverse direction signal containing an echo signal of said forward direction signal and for generating a companding compensated echo estimate in accordance with said quantization compensated signal, said companding estimated echo estimate to be subtracted from said reverse direction signal to provide an echo canceled signal.

2. The apparatus of claim 1 wherein said quantization transformation is the quantization of a digital companding.

3. The apparatus of claim 2 wherein said digital companding is A-law companding.

4. The apparatus of claim 2 wherein said digital companding is μ-law companding.

5. The apparatus of claim 1 wherein said echo signal is a network echo signal.

6. The apparatus of claim 1 wherein said echo signal is an acoustic echo signal.

7. The apparatus of claim 1 wherein said echo signal is a combination of an acoustic echo signal and a network echo signal.

8. The apparatus of claim 1 wherein said echo canceller is in a mobile phone environment.

9. The apparatus of claim 8 wherein said echo canceller is in a code division multiple access (CDMA) mobile phone environment.

10. The apparatus of claim 1 wherein said echo canceller is in a wireless local loop environment.

11. The apparatus of claim 10 wherein said forward direction signal is provided by a vocoder.

12. An echo canceller comprising:
   a quantization compensator having an input for receiving a forward direction signal and encoding said forward direction signal in accordance with a predetermined quantization transformation and having an output to provide a quantization compensated signal, said quantization transformation compensating for compression and expansion (companding) signal processing operations; and
   an adaptive filter having an input for receiving said quantization compensated signal and an output connected to a summing element, said adaptive filter generating a companding compensated echo estimate in accordance with said quantization compensated signal and providing said companding compensated echo estimate to said summing element disposed to remove said companding compensated echo estimate from a reverse direction signal, said summing element having an output for providing an echo canceled signal.

13. The apparatus of claim 12 wherein said quantization transformation is the quantization of a digital companding.

14. The apparatus of claim 13 wherein said digital companding is A-law companding.

15. The apparatus of claim 13 wherein said digital companding is μ-law companding.

16. The apparatus of claim 12 wherein said echo signal is a network echo signal.

17. The apparatus of claim 12 wherein said echo signal is an acoustic echo signal.

18. The apparatus of claim 12 wherein said echo signal is a combination of an acoustic echo signal and a network echo signal.

19. The apparatus of claim 12 wherein said echo canceller is in a mobile phone environment.

20. The apparatus of claim 19 wherein said echo canceller is in a code division multiple access (CDMA) mobile phone environment.

21. The apparatus of claim 12 wherein said echo canceller is in a wireless local loop environment.

22. The apparatus of claim 12 wherein said forward direction signal is provided by a vocoder.

23. A method of echo canceling comprising the steps of:

receiving a forward direction signal;

encoding said forward direction signal in accordance with a predetermined quantization transformation to provide a quantization compensated signal, said quantization transformation compensating for compression and expansion (companding) signal processing operations;

providing said quantization compensated signal to an input of an adaptive filter for generating a companding compensated echo estimate in accordance with said quantization compensated signal; and removing said companding compensated echo estimate from a reverse direction signal containing an echo signal.

24. The method of claim 23 wherein said quantization transformation is the quantization of a digital companding.

25. The method of claim 24 wherein said digital companding is A-law companding.

26. The method of claim 24 wherein said digital companding is μ-law companding.

27. The method of claim 23 wherein said echo signal is a network echo signal.

28. The method of claim 23 wherein said echo signal is an acoustic echo signal.

29. The method of claim 23 wherein said echo signal is a combination of an acoustic echo signal and a network echo signal.

30. The method of claim 23 wherein said method of echo canceling is in a mobile phone environment.

31. The method of claim 30 wherein said method of echo canceling is in a code division multiple access (CDMA) mobile phone environment.

32. The method of claim 23 wherein said method of echo canceling is in a wireless local loop environment.

33. The method of claim 23 wherein said forward direction signal is provided by a vocoder.

34. An echo canceller comprising:

quantization compensation means for receiving a forward direction signal and encoding said forward direction signal in accordance with a predetermined quantization transformation to provide a quantization compensated signal; and adaptive filter means for receiving said quantization compensated signal and a reverse direction signal containing an echo signal, said echo signal resulting from propagation of a companding quantized signal of said forward direction signal over an echo channel and for generating an echo estimate in accordance with said quantization compensated signal and removing said echo estimate from said reverse direction signal.

* * * * *